US009743573B2

(12) United States Patent
Ricketts et al.

(10) Patent No.: US 9,743,573 B2
(45) Date of Patent: Aug. 29, 2017

(54) WEIGHT TRANSFER AND RESIDUE SPREADING APPARATUS FOR AN AGRICULTURAL VEHICLE

(71) Applicant: CNH Industrial America LLC, New Holland, PA (US)

(72) Inventors: Jonathan E. Ricketts, Coal Valley, IL (US); John J. Borsdorf, LeClarie, IA (US)

(73) Assignee: CNH Industrial America LLC, New Holland, PA (US)

( * ) Notice: Subject to any disclaimer, the term of this patent is extended or adjusted under 35 U.S.C. 154(b) by 25 days.

(21) Appl. No.: 14/519,385

(22) Filed: Oct. 21, 2014

(65) Prior Publication Data

US 2016/0106024 A1 Apr. 21, 2016

(51) Int. Cl.
*A01D 41/12* (2006.01)
*A01B 73/06* (2006.01)

(52) U.S. Cl.
CPC ........ *A01B 73/067* (2013.01); *A01D 41/1243* (2013.01)

(58) Field of Classification Search
CPC .............. A01B 73/067; A01D 41/1243; A01D 41/1217; A01D 90/10; A01D 90/14; A01D 93/00; A01D 34/49; A01D 34/71; A01D 43/06; A01D 57/06; A01D 57/20; A01D 57/28; A01F 12/40; A01F 12/39; A01F 25/186; A01F 2025/2045; A01F 29/12; A01C 15/003
See application file for complete search history.

(56) References Cited

U.S. PATENT DOCUMENTS

| | | | | |
|---|---|---|---|---|
| 1,946,655 A * | 2/1934 | Lindgren | ........... | A01D 41/1243 56/122 |
| 1,946,656 A * | 2/1934 | Lindgren | ........... | A01D 41/1243 122/235.22 |
| 2,609,080 A | 9/1952 | Overman | | |
| 2,678,125 A * | 5/1954 | Bonney, Jr. | ............ | B65G 21/14 198/313 |

(Continued)

FOREIGN PATENT DOCUMENTS

| | | |
|---|---|---|
| DE | 2837814 A1 | 4/1979 |
| DE | 102005048052 A1 | 4/2007 |
| EP | 1 897 430 A1 | 3/2008 |

*Primary Examiner* — Robert Pezzuto
*Assistant Examiner* — Adam Behrens
(74) *Attorney, Agent, or Firm* — Peter K. Zacharias; Patrick M. Sheldrake

(57) ABSTRACT

An agricultural harvesting system including a chassis, a plurality of ground support devices carrying the chassis in a direction of travel, and a threshing section carried by the chassis. The threshing section produces residue that is sent to a spreader system. The spreader system has a first orientation and a second orientation. The spreader system includes a support device and a spreader. The support device is in ground contact and is positioned to a side of the chassis relative to the direction of travel when the spreader system is in the first orientation. The support device is positioned aft of the chassis relative to the direction of travel when the spreader system is in the second orientation. The spreader is carried by the support device and is configured to receive at least some of the residue.

18 Claims, 4 Drawing Sheets

(56) References Cited

U.S. PATENT DOCUMENTS 3,037,780 A * 6/1962 Skromme .............. A01D 90/10 239/670
3,149,449 A * 9/1964 Mulder .............. A01D 41/1243 56/192
4,892,504 A * 1/1990 Scott ....................... A01F 12/40 239/666
4,917,652 A * 4/1990 Glaubitz ............ A01D 41/1243 239/682
4,921,469 A * 5/1990 Scharf ................ A01D 41/1243 460/10
5,021,030 A * 6/1991 Halford .............. A01D 41/1243 239/673
5,947,391 A * 9/1999 Beck .................... A01C 15/008 239/677
7,223,168 B2 * 5/2007 Anderson ............... A01F 12/40 460/111
7,661,251 B1 2/2010 Sloan et al.
8,091,331 B2 1/2012 Dow et al.
8,105,140 B2 * 1/2012 Teroerde ............ A01D 41/1243 460/112
8,146,336 B2 * 4/2012 Weichholdt ........ A01D 41/1243 56/112
8,863,489 B2 * 10/2014 Landon .................. A01D 57/28 56/192
8,876,583 B2 * 11/2014 Roberge ............. A01D 41/1243 460/111
2004/0200203 A1 * 10/2004 Dow ...................... A01B 73/02 56/375
2006/0183519 A1 * 8/2006 Benes ................ A01D 41/1243 460/111
2006/0254244 A1 * 11/2006 Geiser .................... A01B 73/02 56/370
2007/0026915 A1 * 2/2007 Anderson ............... A01F 12/40 460/112
2007/0111766 A1 * 5/2007 Holmen ............. A01D 41/1243 460/111
2009/0156277 A1 * 6/2009 Benes ................ A01D 41/1243 460/112
2010/0120482 A1 * 5/2010 Holmen ............. A01D 41/1243 460/112
2010/0311481 A1 * 12/2010 Ritter ...................... A01F 12/40 460/112
2011/0070934 A1 * 3/2011 Teroerde ............ A01D 41/1243 460/112
2011/0130181 A1 * 6/2011 Roberge ............. A01D 41/1243 460/111
2012/0247078 A1 * 10/2012 Landon .................. A01D 57/28 56/192
2012/0270613 A1 * 10/2012 Isaac .................. A01D 41/1243 460/111
2013/0324199 A1 * 12/2013 Roberge ............. A01D 41/1243 460/111
2015/0011274 A1 * 1/2015 Murray ............. A01D 41/1243 460/111

* cited by examiner 14
16
10
70
72
74
76
82
84
84
84
86
86
86

WEIGHT TRANSFER AND RESIDUE SPREADING APPARATUS FOR AN AGRICULTURAL VEHICLE

BACKGROUND OF THE INVENTION

1. Field of the Invention

The present invention relates to an extended spreading apparatus and an integrated weight transfer system for a harvesting system.

2. Description of the Related Art

In common harvesting operations where a combine is used to cut or pick up crop while traveling through a field, it is generally desired to leave the residue in a compact windrow for eventual pickup, or to evenly distribute the residue or MOG (material other than grain) evenly across the entire cut width. Returning the material to the ground provides nutrients for future crops. It is important that MOG be spread evenly such that all future plants have a consistent seed bed, but also because bunched or thicker distribution of straw and chaff, the residue or MOG, can make future field operations more challenging.

During the spreading of crop residue onto a field, a spreader performs only a spreading function and that function may be not used in the event the residue is left in a windrow for later gathering. This means that the spreading function is carried out with a dedicated system. Combines are now situated to carry more and more systems many of which can only perform one useful function.

The problem is that larger combines are becoming too heavy to traverse roads and highways legally. The weight of combines has increased due to needing heavier structures to carry larger headers and with increased volumes of grain in the grain tanks.

What is needed is a system and method for optimization of residue spreading so that the residue may be spread evenly onto the field and that the spreading system serve multiple purposes including support of the weight of the combine.

SUMMARY OF THE INVENTION

Embodiments of the present invention provide a system and method to spread the residue onto a field from a combine and to provide a ground contacting support.

The invention in one form is directed to an agricultural harvesting system including a chassis, a plurality of ground support devices carrying the chassis in a direction of travel, and a threshing section carried by the chassis. The threshing section produces residue that is sent to a spreader system. The spreader system has a first orientation and a second orientation. The spreader system includes a support device and a spreader. The support device is in ground contact and is positioned to a side of the chassis relative to the direction of travel when the spreader system is in the first orientation. The support device is positioned aft of the chassis relative to the direction of travel when the spreader system is in the second orientation. The spreader is carried by the support device and is configured to receive at least some of the residue.

The invention in another form is directed to a spreader system for use by an agricultural combine. The spreader system has a first orientation and a second orientation. The spreader system includes a support device and a spreader. The support device is in ground contact and is positioned to a side of the chassis relative to the direction of travel when the spreader system is in the first orientation. The support device is positioned aft of the chassis relative to the direction of travel when the spreader system is in the second orientation. The spreader is carried by the support device and is configured to receive at least some of the residue.

Advantageously, the present invention has a dual purpose, a residue spreading mode and a transport mode.

Another advantage is that the present invention is that in the event the combine becomes stuck in the field the spreader can be reconfigured to reduce the load carried on other wheels and to even provide additional traction.

Still another advantage is that the load on the wheels is increased by the retraction of the spreader system into the combine.

Additional features and advantages of the invention will be made apparent from the following detailed description of illustrative embodiments that proceeds with reference to the accompanying drawings.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

The terms “grain”, “straw” and “tailings” are used principally throughout this specification for convenience but it is to be understood that these terms are not intended to be limiting. Thus “grain” refers to that part of the crop material that is threshed and separated from the discardable part of the crop material, which is referred to as non-grain crop material, MOG or straw. Incompletely threshed crop material is referred to as “tailings”. Also the terms “forward”, “rearward”, “left” and “right”, when used in connection with the agricultural harvester and/or components thereof are usually determined with reference to the direction of forward operative travel of the harvester, but again, they should not be construed as limiting. The terms “longitudinal” and "transverse" are determined with reference to the fore-and-aft direction of the agricultural harvester and are equally not to be construed as limiting.

Figure 1:
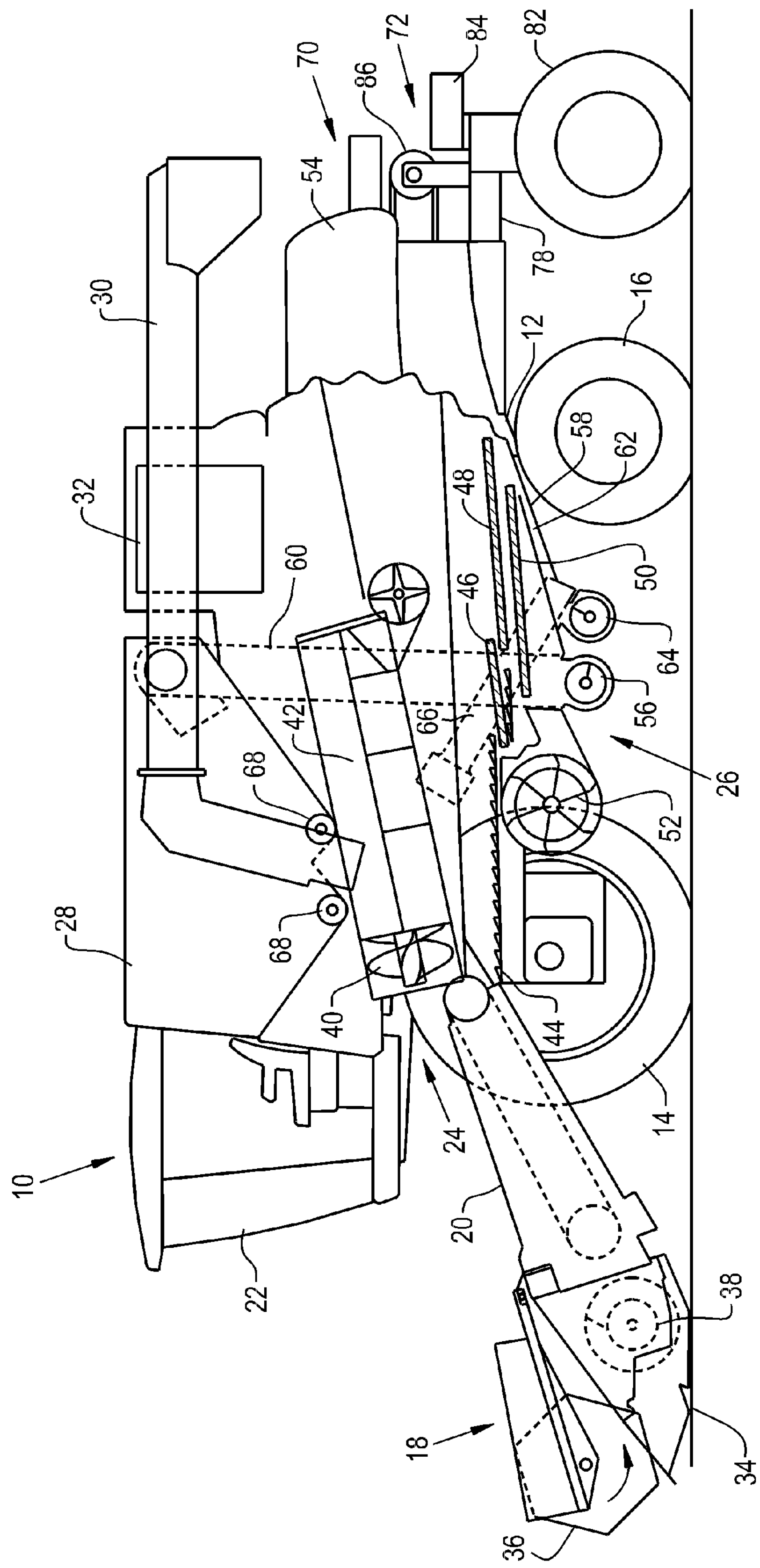
FIG. 1 illustrates a partially sectioned side view of a harvester combine with an attached header, threshing rotor, and spreader system in a transport orientation according to one embodiment of the present invention.

Referring now to the drawings, and more particularly to FIG. 1, there is shown an agricultural harvester in the form of a combine 10, which generally includes a chassis 12, ground engaging wheels 14 and 16, a header 18, a feeder housing 20, an operator cab 22, a threshing and separating system 24, a cleaning system 26, a grain tank 28, and an unloading conveyance 30. Unloading conveyor 30 is illustrated as an unloading auger, but can also be configured as a belt conveyor, chain elevator, etc.

Front wheels 14 are larger flotation type wheels, and rear wheels 16 are smaller steerable wheels. Motive force is selectively applied to front wheels 14 through a power plant in the form of a diesel engine 32 and a transmission (not shown). Although combine 10 is shown as including wheels, is also to be understood that combine 10 may include tracks, such as full tracks or half-tracks.

Header 18 is mounted to the front of the combine 10 and includes a cutter bar 34 for severing crops from a field during forward motion of combine 10. A rotatable reel 36 feeds the crop into header 18, and a double auger 38 feeds the severed crop laterally inwardly from each side toward feeder housing 20. Feeder housing 20 conveys the cut crop to threshing and separating system 24, and is selectively vertically movable using appropriate actuators, such as hydraulic cylinders (not shown).

Threshing and separating system 24 is of the axial-flow type, and generally includes a rotor 40 at least partially enclosed by and rotatable within a corresponding perforated concave 42. The cut crops are threshed and separated by the rotation of rotor 40 within concave 42, and larger elements, such as stalks, leaves and the like are discharged from the rear of combine 10. Smaller elements of crop material including grain and non-grain crop material, including particles lighter than grain, such as chaff, dust and straw, are discharged through perforations of concave 42.

Grain that has been separated by the threshing and separating assembly 24 falls onto a grain pan 44 and is conveyed toward cleaning system 26. Cleaning system 26 may include an optional pre-cleaning sieve 46, an upper sieve 48 (also known as a chaffer sieve), a lower sieve 50 (also known as a cleaning sieve), and a cleaning fan 52. Grain on sieves 46, 48 and 50 is subjected to a cleaning action by fan 52, which provides an airflow through the sieves, to remove chaff and other impurities such as dust from the grain by making this material airborne for discharge from straw hood 54 of combine 10. Grain pan 44 and pre-cleaning sieve 46 oscillate in a fore-to-aft manner to transport the grain and finer non-grain crop material to the upper surface of upper sieve 48. Upper sieve 48 and lower sieve 50 are vertically arranged relative to each other, and likewise oscillate in a fore-to-aft manner to spread the grain across sieves 48, 50, while permitting the passage of cleaned grain by gravity through the openings of sieves 48, 50.

Clean grain falls to a clean grain auger 56 positioned crosswise below and in front of lower sieve 50. Clean grain auger 56 receives clean grain from each sieve 48, 50 and from bottom pan 58 of cleaning system 26. Clean grain auger 56 conveys the clean grain laterally to a generally vertically arranged grain elevator 60 for transport to grain tank 28. Tailings from cleaning system 26 fall to a tailings auger trough 62. The tailings are transported via tailings auger 64 and return auger 66 to the upstream end of cleaning system 26 for repeated cleaning action. Cross augers 68 at the bottom of grain tank 28 convey the clean grain within grain tank 28 to unloading auger 30 for discharge from combine 10.

Now, additionally referring to FIGS. 2-5, according to an aspect of the present invention, a residue handling system 70 is integrated in the rear of harvester 10. Residue handling system 70 includes a chopper and a spreader system 72. Spreader system 72 includes support devices 74 and 76, which move from a transport orientation shown in FIG. 1 to a spreading orientation shown in FIG. 2. The spreading orientation is the extended harvesting orientation that allows the MOG to be spread about the just harvested area aft of harvester 10. The transport orientation results from a movement of support devices 74 and 76 from an extended position that is to the sides of harvester 10, to a retracted position immediately aft of harvester 10. Support members 74 and 76 each include structural members 78 and 80 and a wheel 82. A spreader 84 is positioned on each end of support members 74 and 76, with the MOG being conveyed thereto by a conveyance device 86, which may be in the form of a conveyor belt 86, which is supported by support members 74 and/or 76. Additionally a spreader 84 may be located at the rear of harvester 10. There is at least one actuator 88 that serves to retract structural members 78 and 80 into or under chassis 76.

Figure 2:
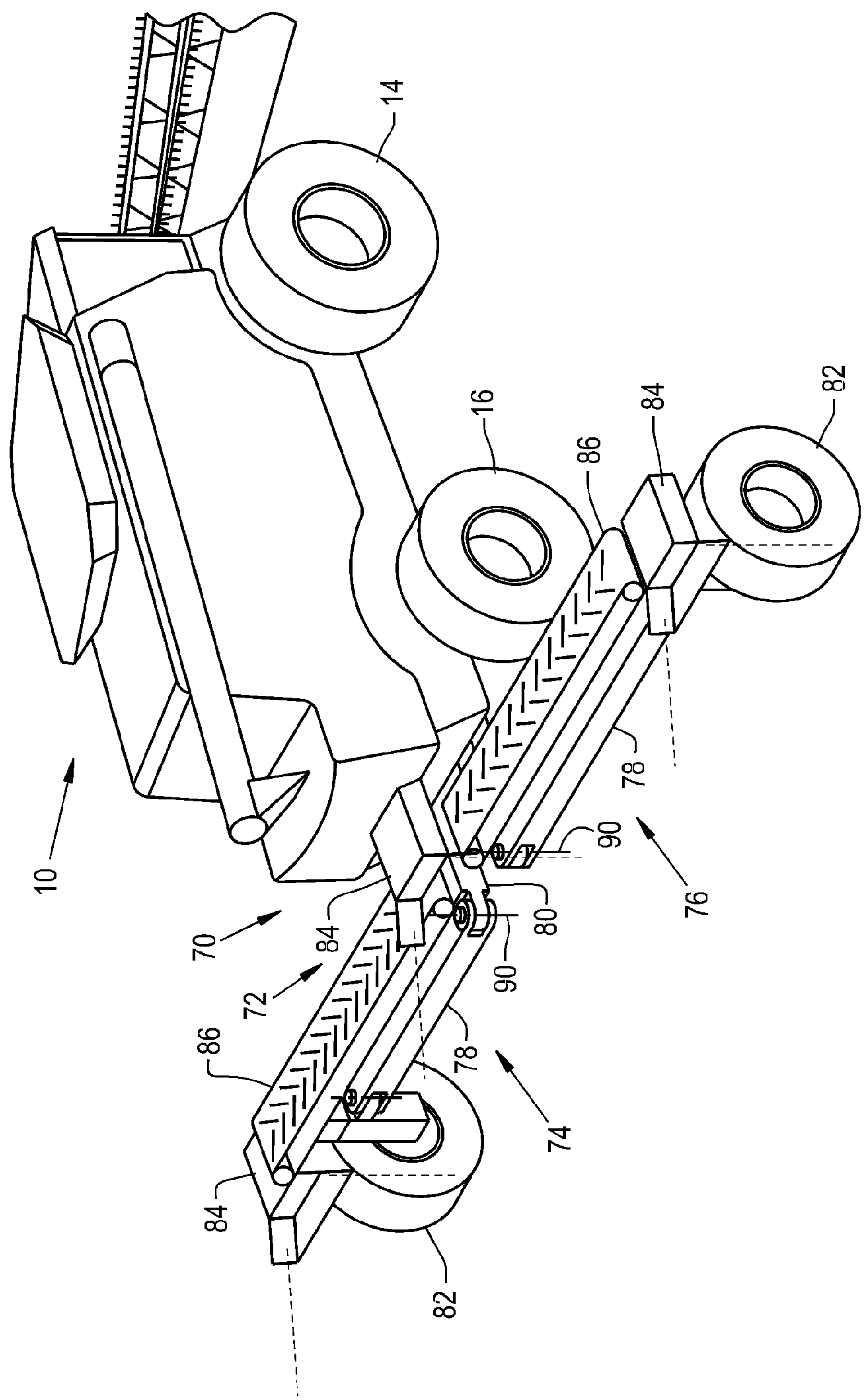
FIG. 2 illustrates a perspective view of the harvester from FIG. 1, with the spreader system in a spreading orientation.
Figure 3:
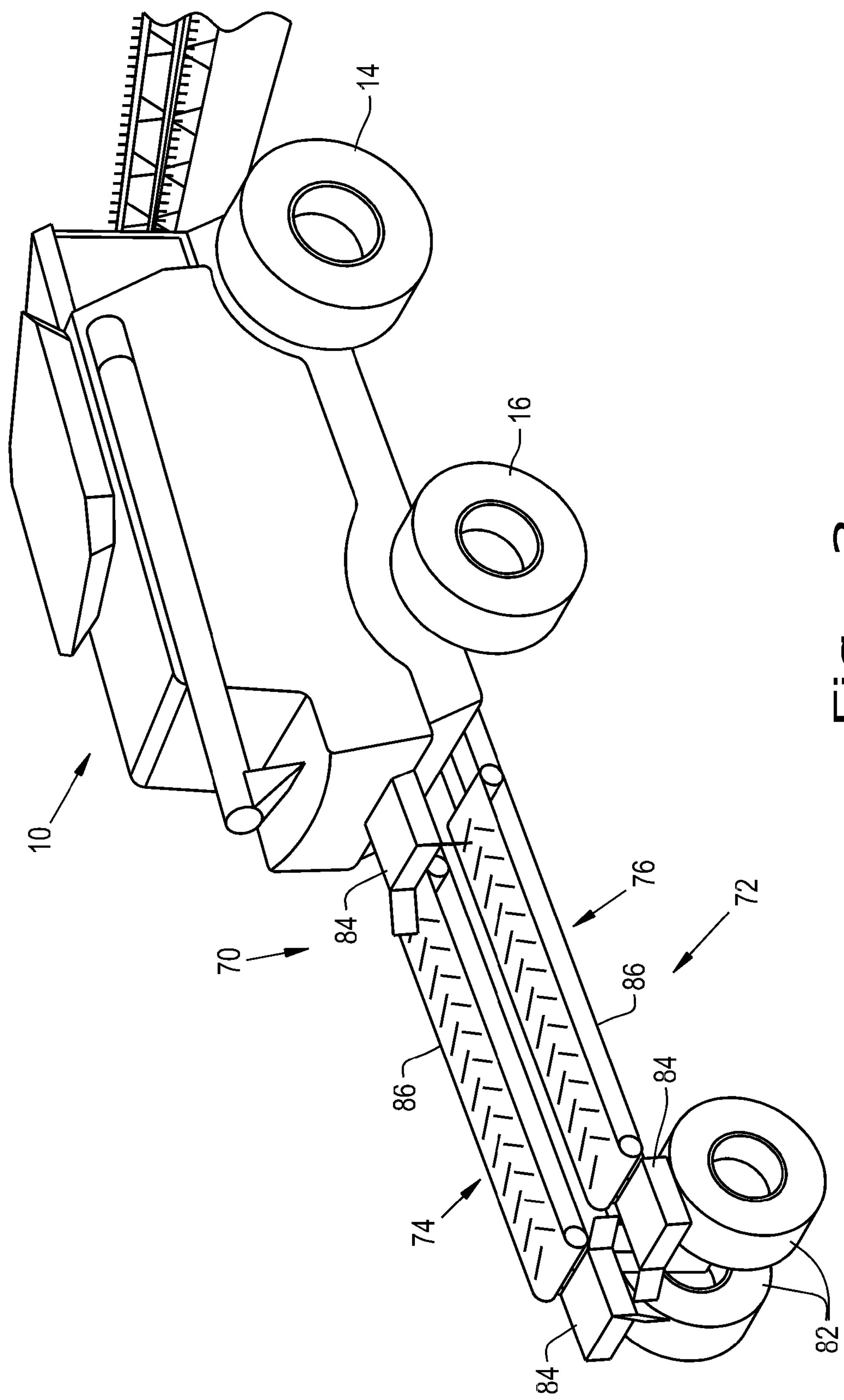
FIG. 3 illustrates another perspective view of the harvester combine of FIGS. 1 and 2, with the residue spreader system in an intermediate state between the transport orientation and the spreading orientation.

Wheels 82 are coupled to structural members 80 and are pivotal about a generally vertical axis allowing wheels 82 to be moved from a spreader orientation shown in FIG. 2 to a transport orientation shown in FIG. 1, the orientations being generally altered by 90° relative to structural members 80. Structural members 78 pivot about a pivot axis 90 and wheels 82 also pivot about a vertical axis as structural members 78 pivot from the spreader orientation shown in FIG. 2 to an intermediate state shown in FIG. 3, after which structural members 78 and 80 are retracted into or beneath harvester 10 to the position shown in FIG. 1 (the transport orientation). Of course, the transition from one orientation to the other uses the intermediate state shown in FIG. 3.

Figure 4:
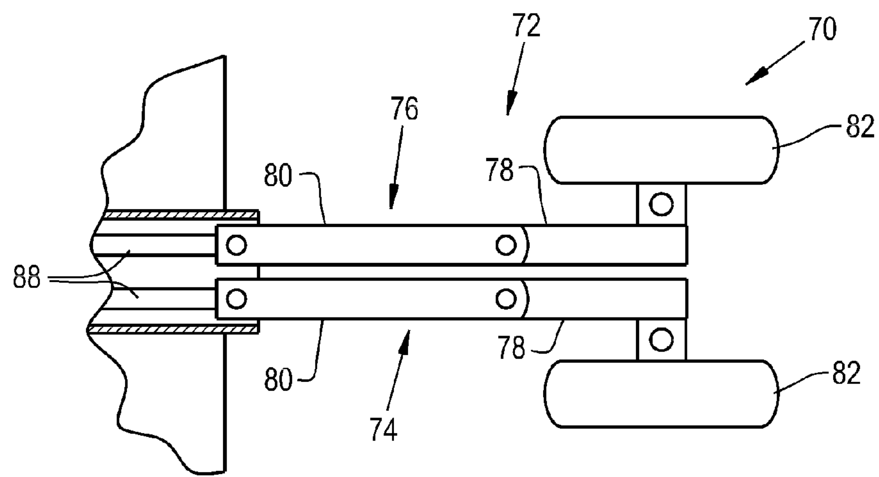
FIG. 4 is a top view of another embodiment of a spreader system of the present invention used with the harvester of FIGS. 1-3, specifically illustrating the retraction of the spreader support into a common structural member, to further illustrate features of the present invention.

Structural members 78 and 80 are drawn into/extended from an apparatus having rollers 92 that facilitate the retraction and extension of structural members 78 and 80. There may be two separate apparatus, one for each set of structural members 78 and 80 or they may be drawn into a single construct as shown in FIG. 4 (a top view). In FIG. 4 the details of conveyance devices 86 has been purposely left out to show how structural members 78 and 80 are drawn into a single construct.

Figure 5:
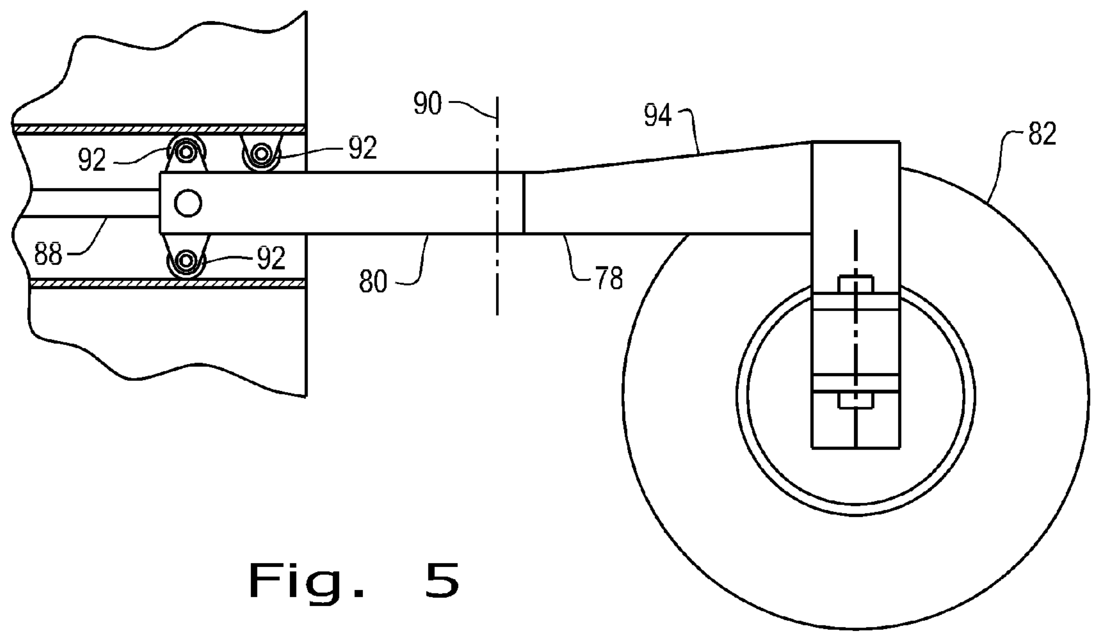
FIG. 5 is a partially sectioned side view illustrating an aspect of the spreader system of FIGS. 1-4, with the mechanism illustrating how additional weight is transferred to the wheels of the spreader system.

In FIG. 5, structural members 78 and 80 are shown having rollers 92 coupled to provide for the movement of structural members 78 and 80 by actuator 88. An inclined surface 94 on the top of structural member 78 and/or 80 causes wheels 82 to have more weight of harvester 10 applied for support as structural members are drawn further in. This is a passive method of increasing the weight transfer of support devices 74 and 76, and other passive methods as well as active methods are contemplated.

While combine 10 is harvesting a crop, if the residue is to be spread onto the field then spreader system 72 is oriented as shown in FIG. 2 so that the residue will be carried by conveyance devices 86 to spreaders 84 to thereby disperse the residue onto the field. When there is not a need to spread the residue, then spreader system 72 can be oriented as shown in FIG. 1. Motors may be coupled to wheels 82 to provide additional drive, or wheels 82 can simply freewheel. Wheels 82 remain pivotal about the vertical axis so that as steering wheels 16 turn harvester 10 wheels 82 will track appropriately along.

The common spreader discs, of the prior art, are generally made in a disc form and may be made out of various materials. The discs are relatively light and are not capable of doing anything except the spreading of residue material from the machine. Advantageously, the present invention allows for multiple uses of the spreader system 72, in that in one orientation it provides for an extended residue distribution and in the other orientation it provides for the support of harvester 10.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural harvesting system, comprising:

an agricultural combine comprising:

a chassis;

a plurality of ground support devices carrying the chassis in a direction of travel; and a threshing section carried by the chassis, the threshing section producing residue; and a spreader system for discharging the residue from the agricultural combine to a ground surface, the spreader system having a first orientation and a second orientation, the spreader system comprising:

at least one wheel;

at least one support device configured for being in a first position to a side of the chassis relative to the direction of travel when the spreader system is in the first orientation, the at least one support device further configured for being in a second position aft of the chassis relative to the direction of travel when the spreader system is in the second orientation, and for being movable from the first position to the second position by pivoting about an axis perpendicular to the ground surface, the at least one support device supported at a first end by the at least one wheel in both the first position and the second position;

at least one actuator configured for linearly retracting at least a portion of the at least one support device when in the second position toward the agricultural combine; and at least one spreader carried by the at least one support device at the first end, the at least one spreader being configured to receive at least some of the residue from the agricultural combine.

2. The agricultural harvesting system of claim 1, wherein the at least one support device carries a first load when in the first orientation and a second load when in the second orientation, the second load being greater than the first load.

3. The agricultural harvesting system of claim 2, wherein the at least one support device includes a first support device and a second support device configured for being positioned on opposite sides of the chassis relative to the direction of travel when the spreader system is in the first orientation, the first support device and the second support device both configured for being positioned aft of the chassis relative to the direction of travel when the spreader system is in the second orientation.

4. The agricultural harvesting system of claim 3, wherein:

the at least one wheel comprises a first wheel and a second wheel;

the first support device and the second support device each include:

a first structural member; and a second structural member pivotally connected to the first structural member; and the first wheel is coupled to the second structural member of the first support device, and the second wheel is coupled to the second structural member of the second support device.

5. The agricultural harvesting system of claim 4, wherein the second structural member of each of the first support device and the second support device is pivotal to align with the first structural member of the each of the first support device and the second support device to place the spreader system in the second orientation.

6. The agricultural harvesting system of claim 4, wherein the first wheel has an alignment with the second structural member of the first support device that is altered by 90° when the spreader system transitions between the first orientation and the second orientation, and wherein the second wheel has an alignment with the second structural member of the second support device that is altered by −90° when the spreader system transitions between the first orientation and the second orientation.

7. The agricultural harvesting system of claim 4, wherein the first support device and second support device are generally a mirror image of each other.

8. The agricultural harvesting system of claim 4, wherein at least one of the first structural member and the second structural member of each of the first and second support devices has a generally ramped portion that interacts with a suspension element to cause the wheels of the first support device and the second support device to have an increased load as the first support device and the second support device are linearly retracted.

9. The agricultural harvesting system of claim 1, further comprising a conveyance device coupled to the at least one support device, the conveyance device being configured to carry the residue to the at least one spreader.

10. An agricultural harvesting system, comprising:

an agricultural harvesting machine comprising:

a chassis;

a plurality of ground support devices carrying the chassis in a direction of travel; and a threshing section carried by the chassis, the threshing section producing residue; and a spreader system for discharging the residue from the agricultural harvesting machine to a ground surface, the spreader system having a first orientation and a second orientation, the spreader system comprising:

at least one wheel;

at least one support device configured for being in a first position to a side of then chassis of the agricultural harvesting machine relative to the direction of travel of the spreader system when the spreader system is in the first orientation, the at least one support device further configured for being in a second position aft of the chassis of the agricultural harvesting machine relative to the direction of travel when the spreader system is in the second orientation, and for being movable from the first position to the second position by pivoting about an axis perpendicular to the ground surface, the at least one support device supported at a first end by the at least one wheel in both the first position and the second position;

at least one actuator configured for linearly retracting at least a portion of the at least one support device when in the second position toward the agricultural harvesting machine; and at least one spreader carried by the at least one support device at the first end, the at least one spreader being configured for receiving at least some of the residue from the agricultural harvesting machine.

11. The agricultural harvesting system of claim 10, wherein the at least one support device carries a first load when in the first orientation and a second load when in the second orientation, the second load being greater than the first load.

12. The agricultural harvesting system of claim 11, wherein the at least one support device includes a first support device and a second support device configured for being positioned on opposite sides of the agricultural harvesting machine relative to the direction of travel when the spreader system is in the first orientation, the first support device and the second support device both configured for being positioned aft of the chassis relative to the direction of travel when the spreader system is in the second orientation.

13. The agricultural harvesting system of claim 12, wherein:

the at least one wheel comprises a first wheel and a second wheel;

the first support device and the second support device each include:

a first structural member; and a second structural member pivotally connected to the first structural member; and the first wheel is coupled to the second structural member of the first support device, and the second wheel is coupled to the second structural member of the second support device.

14. The agricultural harvesting system of claim 13, wherein the second structural member of each of the first support device and the second support device is pivotal to align with the first structural member of the each of the first support device and the second support device to place the spreader system in the second orientation.

15. The agricultural harvesting system of claim 13, wherein the first wheel has an alignment with the second structural member of the first support device that is altered by 90° when the spreader system transitions between the first orientation and the second orientation, and wherein the second wheel has an alignment with the second structural member of the second support device that is altered by −90° when the spreader system transitions between the first orientation and the second orientation.

16. The agricultural harvesting system of claim 13, wherein the first support device and the second support device are generally a mirror image of each other.

17. The agricultural harvesting system of claim 13, wherein at least one of the first structural member and the second structural member of each of the first and second support devices has a generally ramped portion that interacts with a suspension element to cause the wheels of the first support device and the second support device to have an increased load as the first support device and the second support device are linearly retracted.

18. The agricultural harvesting system of claim 10, further comprising a conveyance device coupled to the at least one support device, the conveyance device being configured to carry the residue to the at least one spreader.

* * * * *